(12) United States Patent
Hillman et al.

(10) Patent No.: US 7,010,509 B2
(45) Date of Patent: Mar. 7, 2006

(54) SYSTEM AND METHOD FOR FUNDING AN ACCOUNT AND CONSOLIDATING FINANCIAL RELATIONSHIPS

(75) Inventors: John M. Hillman, Larchmont, NY (US); Andrew F. Schadt, New York, NY (US)

(73) Assignee: Citibank, N.A., New York, NY (US)

( * ) Notice: Subject to any disclaimer, the term of this patent is extended or adjusted under 35 U.S.C. 154(b) by 270 days.

(21) Appl. No.: 09/358,653

(22) Filed: Jul. 23, 1999

(65) Prior Publication Data

US 2003/0093342 A1  May 15, 2003

Related U.S. Application Data

(60) Provisional application No. 60/093,861, filed on Jul. 23, 1998.

(51) Int. Cl.
    *G06F 17/60* (2006.01)
(52) U.S. Cl. .......................... 705/35; 705/14
(58) Field of Classification Search .......... 705/35, 705/14
See application file for complete search history.

(56) References Cited

U.S. PATENT DOCUMENTS

| | | | |
|---|---|---|---|
| 5,117,355 A | | 5/1992 | McCarthy ............... 364/405 |
| 5,297,026 A | | 3/1994 | Hoffman ............... 364/408 |
| 5,745,706 A | * | 4/1998 | Wolfberg et al. ............ 705/35 |
| 5,991,736 A | * | 11/1999 | Ferguson et al. ............ 705/14 |
| 6,009,415 A | * | 12/1999 | Shurling et al. ............ 705/35 |
| 6,026,382 A | * | 2/2000 | Kalthoff ............ 705/35 |
| 6,049,782 A | * | 4/2000 | Gottesman et al. ......... 705/35 |
| 6,243,688 B1 | * | 6/2001 | Kalina ............ 705/14 |

FOREIGN PATENT DOCUMENTS

| WO | WO 93/12489 | 6/1993 |
|---|---|---|
| WO | WO 98/38562 | 9/1998 |

OTHER PUBLICATIONS

"Discover Card Features . . . Cashback Bonus Award" Web archive document.*

* cited by examiner

*Primary Examiner*—Charles R. Kyle
(74) *Attorney, Agent, or Firm*—George T. Marcou; Kilpatrick Stockton LLP

(57) ABSTRACT

The present invention is a method and system for providing for investments to be made on behalf of an individual by a financial institution based on the individual's overall relationship to the financial institution. The relationship consists of the number, types, and size of accounts the individual has with the financial institution and any other companies associated with the financial institution. In addition, the length of time the individual maintains any of the accounts is also considered in the relationship. The financial institution saves resources by retaining individual loyal to the financial institution with larger account amounts and then uses this savings to invest into an account that will increase in value over time so as to provide the individual with greater assets in the future.

1 Claim, 1 Drawing Sheet

SYSTEM AND METHOD FOR FUNDING AN ACCOUNT AND CONSOLIDATING FINANCIAL RELATIONSHIPS

CROSS-REFERENCE TO RELATED APPLICATIONS

This application claims priority to and incorporates by reference U.S. Provisional Patent Application No. 60/093,86 1 entitled "System and Method for Funding an Account and Consolidating Financial Relationships" filed Jul. 23, 1998.

FIELD OF THE INVENTION

The present invention relates to financial services, and more particularly, to a system for enhancing a customer's financial security by enhancing and leveraging a customer's financial relationship with a financial institution.

BACKGROUND

Today's consumers are finding it increasingly difficult to save money for their future. Many consumers are facing rising current expenses, including mortgage or rental property payments, car loan payments, general living expenses, and in many cases school loan payments. These current expenses may even exceed the consumer's disposable income. Thus, a large percentage of a consumer's income is required to pay current expenses, leaving little or no room for allocations to future savings.

This lack of future savings is troublesome in light of the belief that to fund a retirement equivalent to a pre-retirement standard of living, a consumer needs to save 10 to 12 times the salary to support his standard of living. It is widely recognized that one of the easiest ways to save for the future is to save money, even a small amount, over a long period of time such as many years. This makes saving large amounts of money feasible, as the concept of the time value of money results in the savings multiplying in value over the years. For example, one time value of money proposition is that an investment will double in value every 10 years if it increases in value 7% per year, assuming the increases in value are reinvested. Yet, with huge portions of their income needed to pay off current expenses, many consumers are having great difficulty in saving even small amounts of money for their future.

Consequently, when consumers do have money to set aside for future savings, they are increasingly choosing investments with relatively high rates of return. This is especially true in the last few years, with a booming bull market for stocks and a corresponding explosion of investment options such as mutual funds, derivatives, and venture capital funds. The danger with high rate of return investments, however, is that they generally have an increase in the amount of risk. In other words, the consumer has a chance to make a high rate of return on the investment, but he also has an equal or greater chance of losing some or all of his investment.

Generally, most financial planners advise that these types of high risk investments should not comprise a majority of a consumer's investments for the future because of the possibility of losing everything. Yet, the recent and steady climb in the value of stocks has produced a robust image that many consumers are betting everything on. As a result, many consumers are taking money out of the safe shelter of financial institutions and placing their money in high risk investments. Thus, consumers stand a greater chance of losing the money they are setting aside for the future, and financial institutions are losing out on business as many of their best customers are withdrawing funds or just keeping minimum balances.

Along with the exodus of its best customers, financial institutions are faced with increased costs in marketing for new customers and in servicing the remaining customers. To a financial institution, a "best customer" is one who either has a very high balance or one who has very low cost, thus producing a high revenue per customer for the institution. Due to the increasing turnover in their customer base, many financial institutions are required to increase their marketing efforts to recruit new customers. These marketing efforts are expensive, and drain the professional and financial resources of the institution and reduce overall profitability. On the other hand, the customers left at the financial institutions are typically higher cost customers. The "cost" of a customer to a financial institution increases with the customer's use of the financial institution. So, for example, items that add cost include frequent use of a teller, lack of direct deposit of paychecks, calls to the help center, writing a lot of checks, etc. Thus, the attrition of high balance customers and low cost customers leaves financial institutions with higher cost, lower revenue customers, thereby reducing their profit margins.

Additionally, typical financial institutions do not efficiently leverage their existing capabilities to reduce their own costs and add value to their relationship with the consumer. Many financial institutions, particularly the larger ones, offer many different services to meet the needs of the consumer. Most institutions keep these services separate, however, resulting in isolation, duplication and consumer frustration. For example, a financial institution may have banking services, investment services, credit services, loan services and insurance services, among others. These services usually have their own, distinct relationship with a consumer, and often with outside businesses. Often these various services comprise their own divisions, groups or departments that fall under one institution, but that are not particularly integrated. As a result, the benefits of each service are not leveraged to the consumer's or the institution's full advantage. Thus, consumers and financial institutions are looking for solutions to the above-defined problems.

SUMMARY OF THE INVENTION

Figure 1:
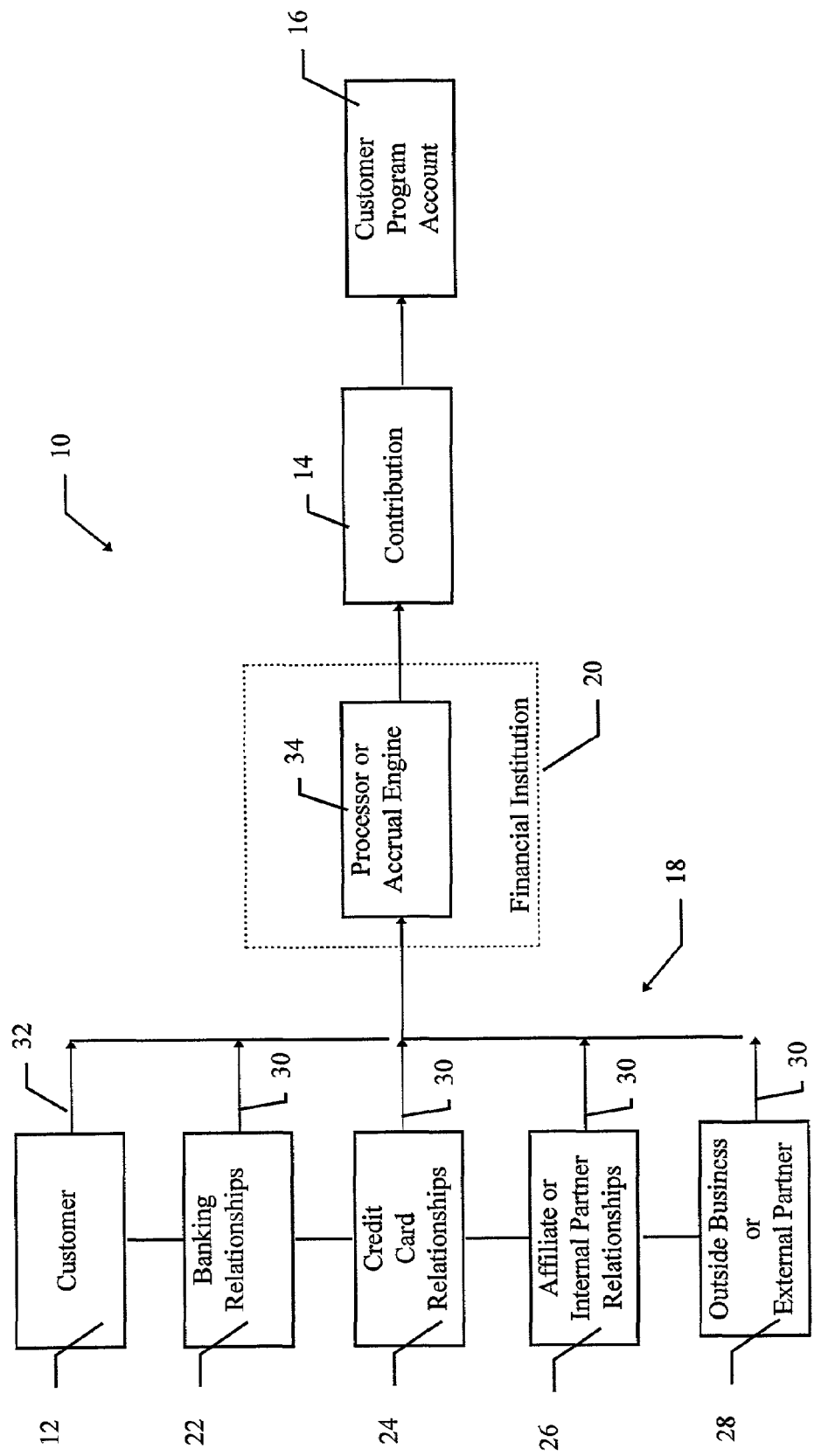
FIG. 1 is a schematic diagram representing one embodiment of the present invention.

According to the present invention, a system for increasing customer loyalty and consolidating a customer's financial relationships comprises leveraging the customer's financial habits and the financial institution's business relationships into a funding engine for the customer's future savings. The system rewards customers for their current relationship with a financial institution and encourages them to expand the relationship into other services offered by the financial institution and its affiliates. Additionally, the system draws upon and integrates the various services of a financial institution to the ultimate benefit of the customer. Finally, the system leverages the financial institution's relationships with external or outside businesses into a benefit for the customer who needs those type of outside business services.

DETAILED DESCRIPTION OF THE DRAWING

Referring to FIG. 1, the system 10 provides a customer 12 with a program contribution or reward 14 that is distributed to a customer program account 16. The customer 12 may have immediate access to the contribution 14, or the customer may allocate the contribution within the program account 16 for later redemption or to benefit the customer's future financial security. The contribution 14 to the program account 16 is based on the various customer relationships 18 with the financial institution 20. These relationships 18 may include any association with the financial institution, such as banking relationships 22, credit card relationships 24, affiliate or internal partner relationships 26, and outside business or external partner relationships 28.

Further, the system 10 provides a self-funding mechanism that allows a customer contribution 32 to the program account 16 through direct contributions and/or by directing interest, dividends, and other income from other accounts or relationships into the program account. Contribution 14 includes the combination of the relationship-specific contribution 30 for each relationship 18 and the customer contribution 32. Thus, the total value in the program account 16 includes relationship-specific contributions 30, customer contributions 32, and any interest, dividends or special payments that may accrue to the program account.

Additionally, the system 10 provides a self-loan feature that allows a customer 12 to borrow from the total value in the program account 16. Also, the system 10 provides a loan securitization feature that allows a customer 12 to utilize the total value in the program account 16 as an asset to obtain a loan. Thus, the system 10 benefits the customer in a number of different ways and provides for the immediate and/or future financial security of the customer in a manner that serves the customer's best interest.

The system 10 is a funding engine that increases customer loyalty and financial consolidation by providing the program contribution 14 to the program account 16. The system 10 is based upon an agreement between the financial institution 20 and the customer 12. In exchange for the customer 12 agreeing to establish a long-term relationship with the financial institution 20, the institution agrees to fund a program account 16 for the customer's immediate and/or future financial benefit. The agreement, in essence, is the financial institution's realization that increased customer loyalty and financial consolidation results in a reduction of marketing and servicing costs for the institution. As a result, the system 10 provides for the best interest of the customer 12 by passing on a part of the financial institution's savings directly to the customer through program contributions 14 to the program account 16.

To fund the customer's program account 16, the system 10 of the present invention provides a processor 34 that holds contribution formulas, and determines, accrues and tracks the amount of total contributions, and generates statements reflecting the transaction history and balance of each program account 16. The processor 34 performs these functions based on the various customer relationships 18. Such relationships 18 may include: the banking accounts 22 held by the customer; the credit card type accounts 24 held by the customer; the accounts/transactions of the customer 12 with affiliates 26 and associated outside businesses 28; and the customer's own contributions 32 and transactions with the program account 16. In a preferred embodiment of the present invention, the processor 34 includes a computer that runs software to perform the various functions required by the system 10. The processor utilizes a relationship measurement to derive a program contribution amount based on a relationship contribution formula. The relationship contribution formula dictates how often the relationship measurement must occur and the frequency of the program contribution amount. In operation, these parameters may be independently changed based on business decisions in implementing the system 10. Also, the formula may vary by the customer/institution relationship and/or by the level of the relationship measurement within each relationship. Thus, the processor 34, acting as an accrual engine, generates a program contribution amount 14, which may be in the form of points, dollars, or any other similar designation that is associated with a value, for each relationship 18.

The processor 34 forwards the program contribution amount information, and if necessary the measurement information, to the financial institution 20, is the processor in a preferred embodiment of the present invention. The financial institution 20 transfers the program contribution amount 14 to the customer's program account 16, which is an account chosen by the customer 12, such as an investment account in a preferred embodiment. The program account 16 is also funded by the customer's direct contributions 32, and by contributions 30 by the bank 22, credit card entity 24, affiliates 26 and associated outside business 28 with whom the customer has a relationship. The customer contribution 32 and relationship-specific contributions 30 may be directed to the program account 16 through the processor 34 or through financial institution 20. Alternatively, each source of contributions 30, 32 independently disburses the contributions directly into the customer program account 16, after the processor 34 has determined the relationship-specific contribution amount 30 (if necessary). The customer 12 then designates the contributions 30, 32 for allocation to a financial account, or the customer redeems the contributions for cash or exchanges them for goods and services either immediately or at a set time in the future based on the above-mentioned agreement. Alternatively, the customer accumulates the contributions until they meet the requirements (i.e. time, minimum amount) for opening a financial account. Thus, the system 10 of the present invention provides a funding engine for a program account 16 benefiting the customer 12 immediately and/or providing for future financial security.

As used herein, the term "program account" includes a number of different embodiments. The program account may be a single account including the total value of contributions accrued by the customer, or it may be a plurality of accounts that, in combination, include the total value of contributions accrued by the customer. As one skilled in the art will realize, the structure of the program account will vary depending on business decisions.

According to a preferred embodiment, however, a program account includes a shell account and at least one brokerage or investment account. The contributions are initially held in the shell account and are allocated to the brokerage account according to a schedule. The shell account, in one embodiment of the present invention, is structured as a typical savings account offered by the financial institution, such that the contributions are secure and earn a nominal amount of interest. The allocation schedule includes a vesting schedule, wherein the contributions are not allocated to the brokerage account until they vest. As one skilled in the art will realize, numerous schedules are possible. For example, one vesting schedule operates over 5 years, where 20% of the contributions held in the shell account vest each year and can then be allocated to the brokerage account. The non-vested contributions in the shell account may be subject to an accrued interest contribution. After the 5 year period, the contributions immediately pass through the shell account or are directly distributed to the brokerage account. Thus, the present invention contemplates numerous embodiments of a program account.

Similarly, as used herein, the terms "affiliate" and "internal partner" refer to related business entities, such as subsidiaries, joint ventures and spin-offs. Also, the terms "external partner" or "outside business associate" include any entity that participates in the system of the present invention, but that is not affiliated with the financial institution or entity implementing the system. Examples of external partners or outside business associates include tax preparers, real estate companies, accountants, insurance companies, and the like.

estate company. The Value of Services (VS) performed with the insurance, tax and real estate companies is $3000, $200 and $4000, respectively. Finally, the customer contributes $1 per day from his checking account directly into his program account. Thus, in this case the customer's relationship with the FI is considered to be "consolidated," meaning that nearly any financial need required by the customer is serviced by the FI.

In the specific embodiments described herein, there is a 1 point to $1 correlation. This is for the sake of simplicity. Consequently, when referring to contributions/value, the inventors use both "$" and "point(s)" interchangeably.

According to one embodiment of the invention, the processor 34 may determine a program contribution amount based on the following:

TABLE 1

| Relationship | Relationship Measurement | Relationship Contribution Formula (annual) | Relationship Contribution Amount |
|---|---|---|---|
| Checking | Average Monthly Balance (AMB) = $1000 | 1) AMB > $5000 × 1% <br> 2) $1000 ≦ AMB ≦ $5000 × ½% | $1000 × ½% = $5 |
| Saving | AMB = $2000 | same as above | $2000 × ½% = $10 |
| Money Market | AMB = $3000 | 1) AMB > $10,000 × 1% <br> 2) $2500 ≦ AMB ≦ $10,000 = ½% | $3000 × ½% = $15 |
| Credit Card | Average Revolving Monthly Balance (ARMB) = $4000 | AMRB × 1% | $4000 × 1% = $40 |
| LOANS: <br> 1) Mortgage <br> 2) Home Equity <br> 3) Auto <br> 4) School | Average Monthly Outstanding Principle Balance (AMOPB) = <br> 1) $80,000 <br> 2) $7000 <br> 3) $6000 <br> 4) $5000 | AMOPB × 1% | 1) $80,000 × 1% = $800 <br> 2) $7000 × 1% = $70 <br> 3) $6000 × 1% = $60 <br> 4) $5000 × 1% = $50 |
| SERVICES: <br> 1) Tax <br> 2) Insurance <br> 3) Real Estate | Value of Services (VS) = <br> 1) $200 <br> 2) $3000 <br> 3) $400 | VS × Value Service Factor (VSF) = 1.5% | 1) $200 × 1.5% = $3 <br> 2) $3000 × 1.5% = $45 <br> 3) $400 × 1.5% = $6 |
| Customer Contribution | $1 per day | sum | $1 × 365 = $365 |
|  |  |  | Total Contributions (Σ) (1 year) = $1469 |

By way of example, one specific embodiment of the present invention comprises a funding engine system having a financial institution (FI) or bank, a processor (which may be part of the financial institution), a customer, an affiliate such as an insurance company and associated outside businesses such as a tax preparation service and a real estate company. The customer has an active program account. Associated with the program account, the customer has opened various accounts with the FI, such as a checking, saving, money market, mortgage loan, home equity loan, automobile loan and school loan accounts. The Average Monthly Balances (AMB) of the checking, saving and money market accounts are $1000, $2000 and $3000, respectively. The Average Monthly Outstanding Principal Balance (AMOPB) of the mortgage, home equity, auto and school loans is $80,000, $7000, $6000 and $5000 respectively. The customer also has a credit card from an entity participating in the system of the present invention. The Average Revolving Monthly Balance (ARMB) of the credit card account is $4000. Also, the customer has utilized the insurance company, the tax preparation service and the real The above example is not intended to be limiting. As mentioned above, and as one skilled in the art will recognize after reading this disclosure, many of the factors used to determine the total contribution amount may vary depending on the business decisions of the FI and the associated outside business. For example, the frequency of the relationship measurement may be daily, weekly, monthly, quarterly, yearly or some other predetermined frequency. The relationship measurement may be an average, a sum, a transaction amount, or any other measurement devised by the entity implementing the system. The contribution formula may be a set amount, a function of the relationship measurement, or some combination of both. Further, the contribution formula may include compounding, such as daily, weekly, monthly quarterly or yearly. Finally, the frequency of disbursements to the program account may vary, as they may be daily, weekly, monthly, quarterly or yearly.

The Value of Services Factor (VSF) is an amount negotiated with each affiliate and associated outside business. As such, each affiliate and associated outside business may have a different VSF. The VSF may equal the entire value of a transaction with the affiliate or associated outside business, a fixed amount per transaction, some function of the transaction amount, or some combination of each method.

If a total value of $1469 is accrued during the customer' first year of participation in the program, the customer may redeem the accrued value according to the following schedule:

TABLE 2

| 1st year | 2nd year | 3rd year | 4th year | 5th year | 6th year + |
|---|---|---|---|---|---|
| 20% of $1469 at end of 1st year | 40% of accrued points at end of 2nd year; 5% incrementally each quarter | 60% of accrued points at end of 2nd year; 5% incrementally each quarter | 80% of accrued points at end of 2nd year; 5% incrementally each quarter | 100% of accrued points at end of 2nd year; 5% incrementally each quarter | all accrued points redeemable each quarter |

TABLE 2 is but one example of a vesting schedule which might be employed by the participating FI in order to guarantee a customer's participation in the funding engine system for an extended period of time. The system is beneficially readily accepted and understood by the customer, as it is similar to a 401(k) account in some manners. A variation to the vesting schedule of TABLE 2 might include the immediate, 100% vesting of the customer's direct contributions to the program account. Applying this variation to the example of TABLE 1, the customer's $1 per day contribution will be immediately redeemed to the brokerage account of the customer's choosing (discussed below).

Further, as an additional incentive to consolidate all financial needs within a particular FI, the FI may offer a point matching scheme, similar to the following:

TABLE 3

| Total Annual Points | Percentage Matched by Financial Institution |
|---|---|
| 50–100 | 25% |
| 100–250 | 50% |
| 250–1000 | 75% |
| >1000 | 100% |

Assuming that the FI participating in the example of TABLE 1 also offers the matching incentives illustrated in TABLE 3, at the end of year 1, the customer would actually have an accrued value $2938 in the shell account of the customer's program account from which the customer could redeem 20% after the 1st year.

Continuing with reference to the example of TABLE 1, once the accrued value points are vested and redeemable, the customer may choose from any of a variety of brokerage accounts into which the customer puts the accrued, vested value. Mutual funds, annuities and money market accounts, among others, are suitable types of investment accounts. Since these types of investment accounts present varying amounts of risk, the FI may choose to offer a minimum amount of return, (for example, 3%–5%) in order to give the customer some peace of mind. Further, certain of these accounts may be offered with significant tax benefits.

Also, the brokerage account may include a special set of accounts set up by the FI or entity implementing the system. For example, the set of accounts may include a select number of commercially available accounts, or it may include a set of accounts exclusively established for customers participating in the system. If the brokerage account includes a number of accounts, then the customer may have the option to indicate how to disburse the total value among the accounts. Also, the customer may have the option to transfer value from one account to another account. As one skilled in the art will realize, the FI or entity implementing the system of the present invention may have certain requirements or restrictions that must be fulfilled in order for a customer to enter into an account, such as a minimum amount of value, or to cash-out or transfer-out of an account, such as a set time period.

There might also be a requirement that the customer take an affirmative step in order to redeem the value within a set time period. For example, the FI might require that vested points be redeemed within 90 days or will be subject to expiration. Contrary to this requirement, the FI might offer the service of causing the value to be automatically redeemed into a chosen account or accounts once they are vested. One skilled in the art can appreciate the many variations possible with regards to these types of redemption requirements. Each participating FI and customer must perform a cost/benefit analysis to determine the most efficient and lucrative arrangement based on their needs.

Further, the customer may take out a loan against the value of funds in the program account. The loan may be repaid back into the program account over a repayment term in the full amount of the loan plus an optional amount of interest. Additionally, the customer may utilize the value in the program account as security for other loans. Similarly, the customer may utilize the value in the program account in exchange for goods or services provided by any entity participating in the system.

As an additional benefit to the customer, the system provides for time-to-time bonuses to the program account based on the customer's financial relationships. The requirements and amount of this one-time bonus may vary, depending on the business decisions of each financial institution or the entity implementing the present system.

Additionally, a customer may have a plurality of sub-relationships within each type of relationship. For example, the customer may have two separate savings accounts, or a savings, checking and money market account under a single banking relationship. Similarly, the customer may have a plurality of similar relationships that participate in the system. For example, the customer may have two different checking accounts from two different banking relationships. In these cases, the system analyzes each account/relationship/sub-relationship separately and tallies the results for all such accounts/relationships/sub-relationships.

The system provides for the universal need of immediate and future financial security by advantageously capitalizing on the current financial behavior of the customer. Additionally, the system beneficially encourages the customer to modify his financial behavior in a manner that reduces cost to the financial institution. For example, the system may require the customer to maintain a certain minimum balance in specified accounts, or the system may limit the number of personal teller transactions or the number of checks written per month. If the predetermined standards are not met, then the system reduces the contribution amount according to a pre-set schedule. For example, if an average minimum balance in a checking account is not maintained one month out of a twelve month period, the system may reduce the contribution amount associated with that checking account by $\frac{1}{12}$th. The system advantageously directs the customer to increase utilization of the most cost efficient means available to perform a desired financial relationship or transaction. Thus, not only does the system of the present invention capitalize on current behavior, but it modifies future behavior to the benefit of both the financial institution and the customer.

Although the invention has been described with reference to these preferred embodiments, other embodiments can achieve the same results. Variations and modifications of the present invention will be apparent to one skilled in the art and the above disclosure is intended to cover all such modifications and equivalents.

What is claimed is:

1. A computer-implemented method for leveraging a financial relationship between a customer and a financial institution, comprising:

establishing a financial account at the financial institution for the benefit of the customer;

adding value to the financial account at predetermined intervals, wherein the value is comprised of immediate access value and vested access value, and further wherein the immediate access value is added to the first financial account by the customer in an amount determined by the customer and at the direction of the customer;

using the computer to calculate the vested access value by (a) determining a number of individual components comprising the financial relationship;

(b) calculating an individual value for each of the individual components at the end of a set period of time, (c) multiplying the determined individual value of each of the individual components by a pre-selected percentage to obtain a vested access value; and adding the vested access value to the financial account, wherein the immediate access value is retrievable by the customer from the financial account without restriction, but the vested access value is only retrievable by the customer after a predetermined period of time.

* * * * *